Nov. 26, 1968  A. D. STRUBLE, JR  3,412,957

INFLATED BALLOON

Filed Sept. 24, 1965

United States Patent Office 3,412,957
Patented Nov. 26, 1968

3,412,957
INFLATED BALLOON
Arthur D. Struble, Jr., 1754 S. Crenshaw Blvd.,
Torrance, Calif. 90501
Filed Sept. 24, 1965, Ser. No. 489,999
16 Claims. (Cl. 244—33)

ABSTRACT OF THE DISCLOSURE

A dirigible-shaped inflated balloon having an internal curtain with a superpressuring line attached to the curtain, the superpressuring line then being attached to a collapsible tube and passing outwardly of the body of the balloon, whereby the volume of the body may be changed by pulling on or releasing the superpressuring line, the superpressuring line then includes an elastic section; it passes about the rotor of a generator and through an annular tube on which the generator is located to a remote tethering or operating location, and inelastic support lines are attached to the body member and to the annular tube. The body member may be provided with inflatable, retractible fins for stabilization and a reflective surface may be formed on the nose of the balloon.

---

The present invention relates to a dirigible-shaped inflated balloon with means for superpressuring the balloon from a remote position through a tether or load cable.

The novel features of the vehicle will be apparent from the following detailed description when read in conjunction with the drawings, wherein.

Figures 1, 2, 3:
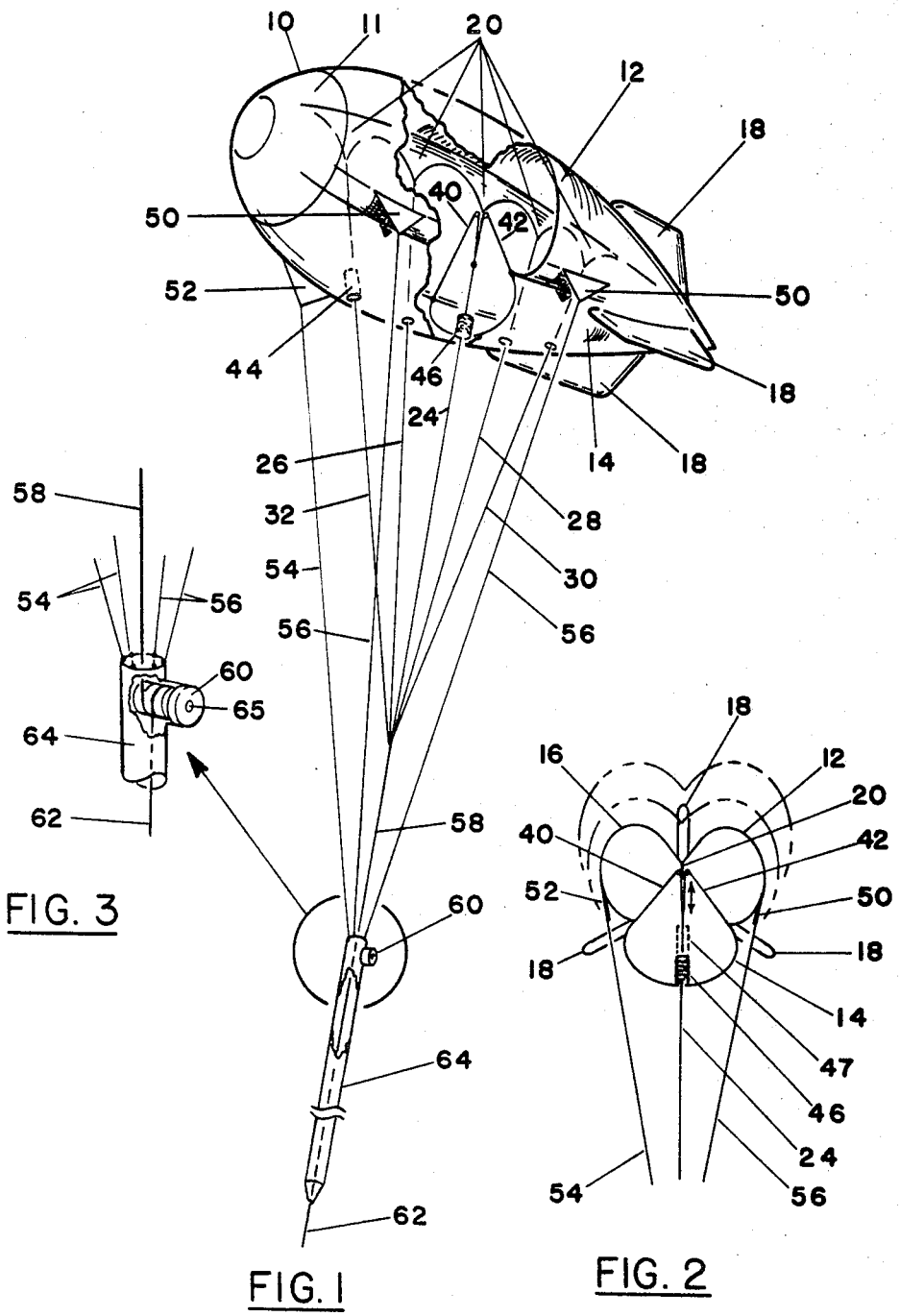
FIGURE 1 is an isometric view, partially in section, of the vehicle of the present invention.
FIGURE 2 is a cross-section of the vehicle of FIGURE 1.
FIGURE 3 is an enlarged view, partially in section, of the generator of FIGURE 1.

In accordance with the drawings, the vehicle includes a generally dirigible or cigar-shaped body member 10. The body member 10 is made up of a clover-leafed cross section comprising leaves 12, 14 and 16, respectively. Attached to the interior of the balloon adjacent the juncture of leaves 12 and 16 is superpressuring curtain 20. Sections 40 and 42 of superpressure line 24 pass through appropriate eyelets or the like on curtain 20 and are attached to the interior of body 10 at the juncture points of leaves 14 and 12 and 14 and 16, respectively. The superpressure line 24 then passes through a collapsible, generally-cylindrical superpressure tube 46, thence out the bottom of leaf 14 and terminates in a superpressuring line 24. Like, superpressure lines 26, 28, 30 and 32 are attached to the superpressuring curtain 20 in the same manner, as through superpressure tube 44. It is to be seen, as shown in FIGURE 2, that when superpressure line 24 is pulled downwardly it will pull curtain 20 downwardly and thus compress or make smaller the entire configuration of the inflated body 10 and in particular the leaves 12 and 16. This of course superpressures the balloon. On the other hand, the release or upward movement of superpressure line 24 will permit release of the pressure and enlargement of the cavity of the body member 10. Attached to the exterior of leaves 12 and 16 are load webs 50 and 52, respectively. Load webs 50 and 52 have attached thereto appropriate load lines 54 and 56. This of course is the general support for the vehicle. Also exteriorly mounted and positioned between the leaves of the body member 10 are retractable, inflatable fins 18. The superpressuring lines 24, 26, 28, 30 and 32 converge and then form a single repressuring line 58. Repressuring line 58 passes into and through a tethering tube 64 and then terminates at the bottom end of tethering tube 64 being tied into tethering line 62. In order for the volume of body 10 to change and thus maintain a specific level of superpressure within body 10, line 58 should be elastic to permit it to stretch and contract. Accordingly, line 58 may be of nylon, rubber, polypropylene, polyethylene, bungies, metal springs, etc. For example, nylon has stretch characteristics of about 40% and polyethylene, in some cases, 200%. If it is desired that superpressure line 24 move up and down 20 feet, a superpressure line 58 several hundred feet long would need to stretch only 10%. If it is desired that the load on line 58 should vary only a very little, line 58 should be 400 to 500 feet long so that the total amount of stretch is a small percentage of the total length of line. In the latter case, the load would be more constant and the degree of superpressure more constant. Tethering tube 64 serves the purpose of preventing the tethering line 62 from becoming fouled around superpressuring line 58 as the balloon turns in its operation and also serves as support means for reel 65. The superpressuring line 58 passes about a reel 65 which forms a part of an electrical generator 60.

It is to be seen that when the volume of the balloon changes and thus the tethering line is raised or lowered this raising or lowering of the line will rotate reel 65 and thus generate power. This of course may occur due to changes in atmospheric pressure, the diurnal effects occurring in the atmosphere or it may also be brought about by manual operation, that is, by manually pulling on the tethering line and then releasing it. This of course is one of the most simple means of generating power which has been conceived for this type of vehicle.

Body 10 also has formed thereon reflective sphere 11, for passive communication purposes. Reflector 11 could also be lenticular in shape. In addition, reflector 11 can be an integral part of body 10 or a separate device hung within the body.

It is to be observed that, while the body has been shown and described as having three leaves, this is not critical and any number of leaves may be utilized. Likewise, one or more superpressuring curtains may be disposed in the body; and, accordingly, the body can assume various reduced volume configurations, depending upon the number and mode of attachment of the curtains. Other variations and modifications of the invention will occur to those skilled in the art. Accordingly, it is to be understood that the present invention is to be limited only in accordance with the appended claims.

I claim:
1. A buoyant vehicle, comprising:
 (a) an inflatable, flexible body member;
 (b) load line means connected to said body member and connected to and carrying a reel support means;
 (c) reel means mounted on said reel support means; and
 (d) superpressuring means operatively associated with said body member and operable independently of said load line means, including a superpressuring line means connected to said body member, to contract and expand said body member, respectively, when the tension on said superpressure line means changes, leading to and wound about said reel means and thence leading to a remote tethering location.

2. A vehicle in accordance with claim 1 wherein the body member is a generally dirigible-shaped body member.

3. A vehicle in accordance with claim 2 wherein the dirigible-shaped body member has a cross section generally shaped like a three-leafed clover.

4. A vehicle in accordance with claim 3 wherein the superpressuring means includes at least one curtain internally attached to the body member at the point of juncture of two of the leaves and the superpressuring line is attached to said curtain and adapted to pull said curtain toward the opposing wall of said body member.

5. A vehicle in accordance with claim 4 wherein the curtain extends substantially the full length of the body member.

6. A vehicle in accordance with claim 4 wherein the superpressuring line includes one portion attached to the upper free end of a compressible, cylindrical superpressuring tube and the other end passes freely through the lower end of said superpressuring tube.

7. A vehicle in accordance with claim 1 which includes a plurality of inflatable stabilizing fins mounted on the exterior of the body member.

8. A vehicle in accordance with claim 1 wherein the superpressuring line means includes an intermediately-disposed, elastic section.

9. A vehicle in accordance with claim 8 wherein the elasticity of the elastic section is preselected to maintain a given degree of superpressure in the body member under varying atmospheric conditions.

10. A vehicle in accordance with claim 1 wherein the reel support is an elongated hollow tube and the superpressure line means passes freely through said hollow tube and thence to the remote location.

11. A vehicle in accordance with claim 1 wherein the reel means forms a part of an electrical generator.

12. A vehicle in accordance with claim 11 wherein the superpressuring line means includes an intermediately-disposed, elastic section.

13. A vehicle in accordance with claim 12 wherein the elastic section of the superpressuring line means is between the reel means and the body member.

14. A vehicle in accordance with claim 1 wherein a reflective surface is included.

15. A vehicle in accordance with claim 14 wherein the reflective surface is generally spherical in form.

16. A vehicle in accordance with claim 14 wherein the reflective surface is generally lenticular in form.

References Cited

UNITED STATES PATENTS

| | | | |
|---|---|---|---|
| 1,031,148 | 7/1912 | Ranza | 244—31 |
| 1,542,547 | 6/1925 | Gibbs | 244—33 |
| 1,671,922 | 5/1928 | Avorio | 244—33 |
| 1,717,552 | 6/1929 | Dunn | 244—58 X |
| 2,463,517 | 3/1949 | Chromak | 244—31 X |

FOREIGN PATENTS 130,657  8/1919  Great Britain.

MILTON BUCHLER, *Primary Examiner.*

T. MAJOR, *Assistant Examiner.*